(12) United States Patent
Phillips

(10) Patent No.: US 8,403,296 B2
(45) Date of Patent: Mar. 26, 2013

(54) METAL SEAT SEAL WITH FLEXIBLE SEALING EDGE

(75) Inventor: Barney Phillips, Aberdeen (GB)

(73) Assignee: Vetco Gray Inc., Houston, TX (US)

( * ) Notice: Subject to any disclaimer, the term of this patent is extended or adjusted under 35 U.S.C. 154(b) by 200 days.

(21) Appl. No.: 12/955,653

(22) Filed: Nov. 29, 2010

(65) Prior Publication Data

US 2012/0132842 A1    May 31, 2012

(51) Int. Cl.
*F16K 25/00*    (2006.01)

(52) U.S. Cl. .................. 251/196; 251/171; 251/328

(58) Field of Classification Search .................. 251/171, 251/174, 328, 193, 195, 196
See application file for complete search history.

(56) References Cited

U.S. PATENT DOCUMENTS

| | | | | |
|---|---|---|---|---|
| 4,124,194 A | * | 11/1978 | Alvarez et al. | 251/159 |
| 4,290,581 A | * | 9/1981 | Moran et al. | 251/172 |
| 4,541,449 A | * | 9/1985 | Burke et al. | 137/72 |
| 4,645,179 A | * | 2/1987 | Ali | 251/327 |
| 5,037,064 A | * | 8/1991 | Pond | 251/195 |
| 5,211,373 A | * | 5/1993 | Baker | 251/196 |
| 5,467,966 A | * | 11/1995 | Nicholson | 251/174 |
| 6,302,211 B1 | | 10/2001 | Nelson et al. | |
| 6,668,919 B2 | | 12/2003 | Radi | |
| 7,040,407 B2 | | 5/2006 | Jennings et al. | |
| 7,325,783 B2 | | 2/2008 | Hunter | |

FOREIGN PATENT DOCUMENTS

| | | |
|---|---|---|
| EP | 0124234 A2 | 11/1984 |
| GB | 2316465 A | 2/1998 |
| GB | 2425819 A | 11/2006 |

OTHER PUBLICATIONS

GB Search Report dated Dec. 19, 2011 from corresponding Application No. GB1119921.3.

* cited by examiner

*Primary Examiner* — John K Fristoe, Jr.
*Assistant Examiner* — Reinaldo Sanchez-Medina
(74) *Attorney, Agent, or Firm* — Bracewell & Giuliani LLP

(57) ABSTRACT

A gate valve seat has structure formed on it to provide a sealing edge or lip which flexes when loaded. The lip forms a dual seal against portions of the gate valve body when the seat is placed under load.

16 Claims, 4 Drawing Sheets

METAL SEAT SEAL WITH FLEXIBLE SEALING EDGE

BACKGROUND OF THE INVENTION

1. Field of the Invention

This invention relates in general to gate valve seat seals, and in particular to a metal seat seal that has a flexible sealing edge to form a dual seal.

2. Description of the Prior Art

Gate valves have been used on subsea wellhead assemblies for a number of purposes. In such service usage, gate valves have been required to provide reliable sealing under harsh service conditions, which include high pressure, wide temperature ranges, the presence of corrosive fluids, sand particles, debris and the like. A number of gate valves have used various forms of seals which have been formed of elastomeric or other non-metallic materials and fitted at the locations required for sealing against fluid leakage. However, so far as is known, such non-metallic seals have been regarded as often failing to meet the requirement of sealing under harsh service conditions.

SUMMARY OF THE INVENTION

Briefly, the present invention provides a new and improved valve seat, having a tubular body member for mounting in a valve body. The tubular body of the valve seat has a rearward end and a forward end for engagement by a valve element. The tubular body member further has a passage having a longitudinal axis and extending from the forward end through the tubular body member to the rearward end. A flexible lip is formed on the tubular body member at the rearward end. The flexible lip extends rearwardly outwardly from the rearward end of the tubular body member and has a curved rearward sealing surface formed thereon for sealing engagement with the valve body. The flexible lip further extends radially outwardly beyond an outer diameter of the tubular body member and has a radial outward sealing surface formed thereon for sealing engagement with the valve body.

DETAILED DESCRIPTION OF THE PREFERRED EMBODIMENTS

Figure 1:
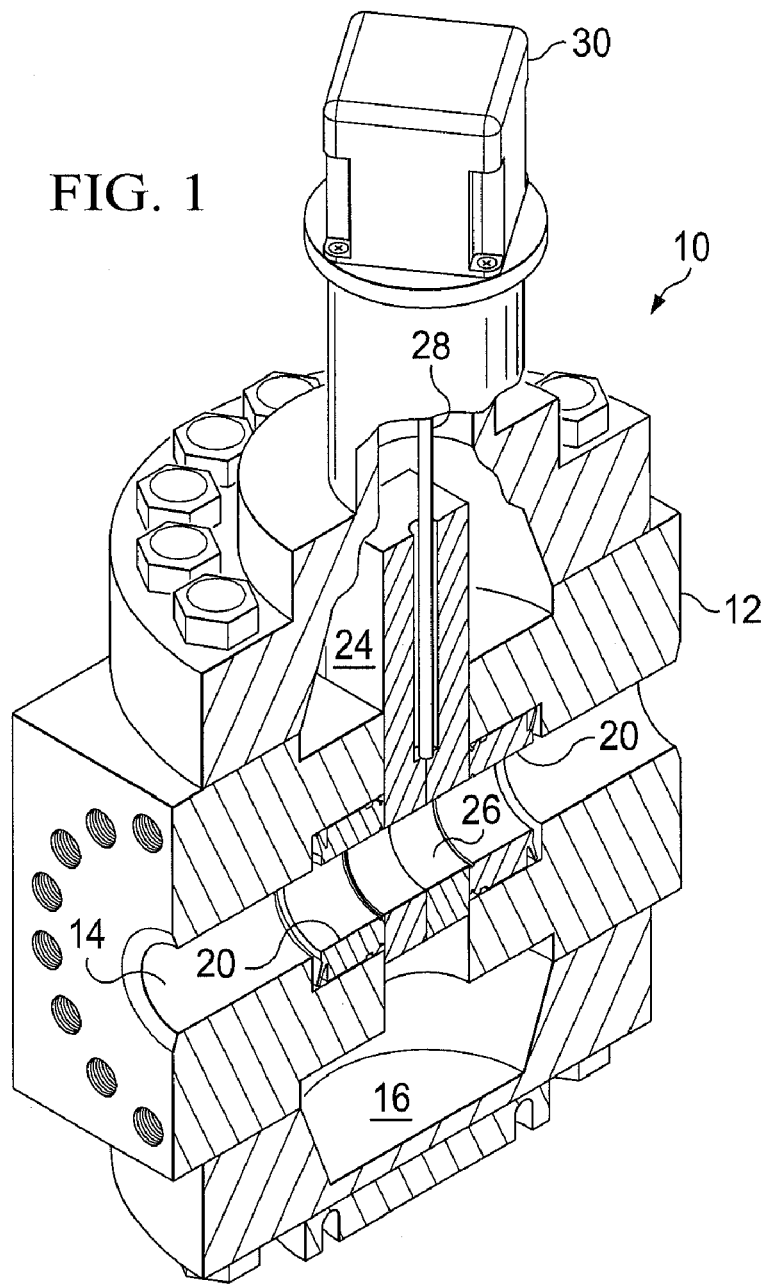
FIG. 1 is an isometric view, partially broken away, of a gate valve having seat seal according to the present invention.

Referring to FIG. 1, gate valve 10 has a body 12 which has a longitudinally extending passage 14 which is connected at each end to a flowline or other mating equipment (not shown). The passage 14 extends transversely through the valve body 10 from opposite sides and through a vertically extending central cavity 16. A pair of seat rings 20 are mounted on each side of the central cavity 16 at the juncture of the passage 14 and cavity 16 in circumferentially extending counterbores 22. The counterbores 22 extend along central axes which are coaxial with the longitudinal axis of the passage 14.

A gate member 24 of the gate valve 10 moves within cavity 16 between an open position, which is shown in FIG. 1, and a closed position. Gate 24 may be a split slab or may be a single slab as shown. Gate 24 has a central opening 26 through it that registers with passage 14 when in the open position. An actuator stem 28 causes gate 24 to move between the open and closed positions. Stem 28 may be either a non-rising type or a type that moves along its axis when rotated. Actuator stem 28 is operated by a valve actuator 30, which may be of the hydraulic, electrical, or manual type, to move the gate 24 between the closed and open positions.

Figure 2:
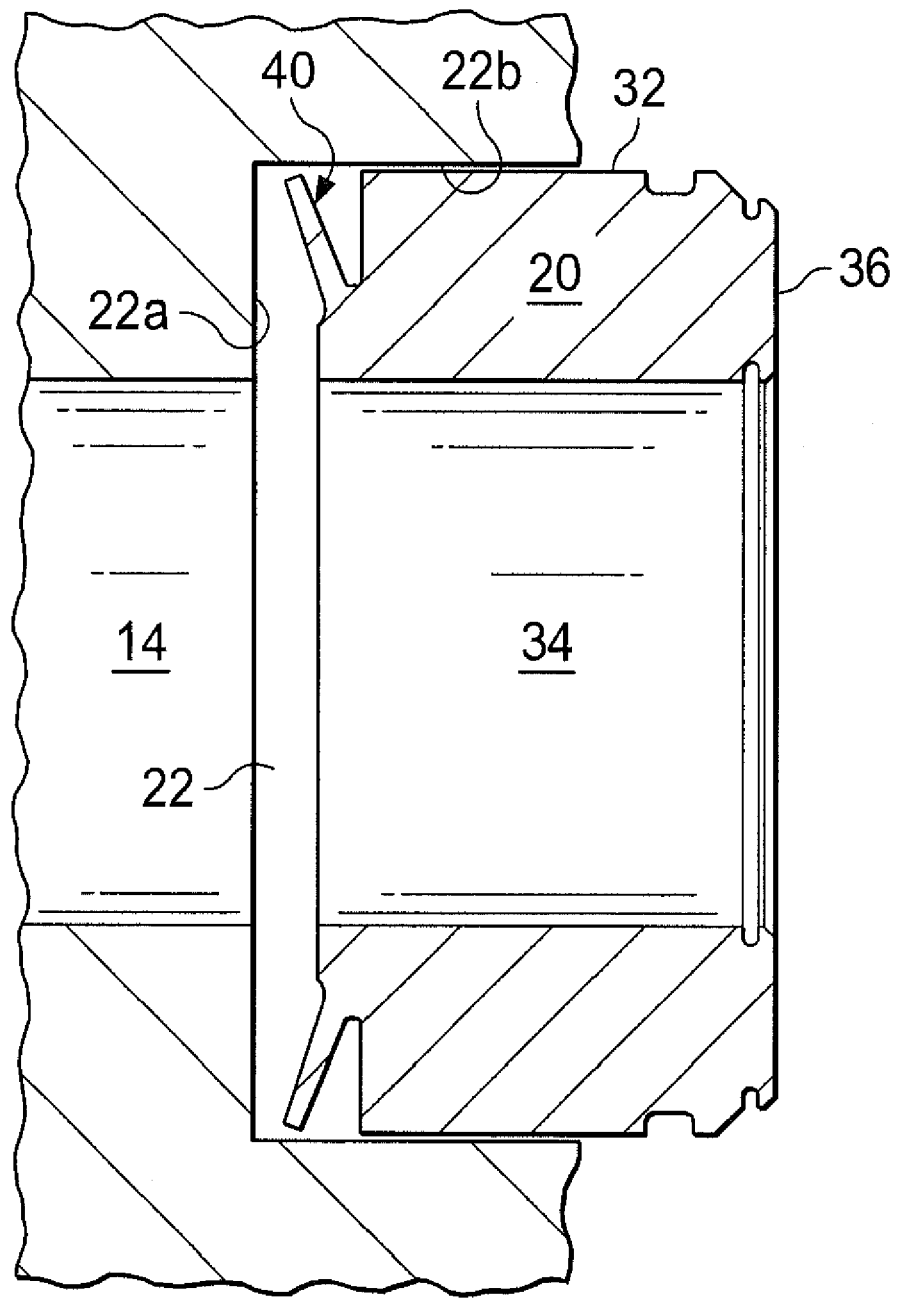
FIG. 2 is an enlarged sectional view of one of the seat rings of the gate valve of FIG. 1

Referring to FIG. 2, a seat ring 20 according to the present invention is located within each of the counterbores 22 with a slight clearance in the valve body 12. The seat ring 20 may be formed, for example, from 17-4 ph stainless steel or 718 nickel steel alloy. It should be understood that other steels may also be used, if desired. Seat ring 20 is a tubular member having an outer diameter surface 32 that fits closely in counterbore 22 and an inner passage 34 which has a diameter corresponding to the inner diameter of the passage 14. Inner passage 34 thus has effectively the same inner diameter as passage 14. Seat ring 20 has a forward end or face 36 formed on a forward end for engagement by gate 24 (FIG. 1). The front end or face 36 of the seat ring 20 may take any of several conventional forms. By way of example the front face 36 of seat ring 20 may be of the type set forth in commonly owned U.S. Pat. No. 7,325,783, which is incorporated herein by reference.

Seat ring 20 according to the present invention is provided with a cylindrical metal sealing lip or collar member 40 (FIG. 3) formed extending outwardly and radially away from an annular rear shoulder or collar surface 42 on a rear face 44. The sealing lip 40 has an inclined rear face 46 extending outwardly from a rounded or arcuate transition surface 48 adjacent the rear surface 42. The inclined rear face 46 is a rear wall of the circumferentially extending sealing lip or collar member 40.

The rear face 46 of the sealing lip 40 extends radially outwardly and away to a first rounded, circumferentially extending contact and sealing surface 52. When the lip 40 is unflexed (FIG. 3), the sealing surface 52 extends rearwardly and outwardly beyond the vertical plane of the rear face 44. The lip 40 is flexible, however, and the sealing surface 52 provides, in a manner to be set forth, a first of the dual seals according to the present invention. The sealing occurs due to sealing contact of surface 52 with an inner transverse wall 22a of the counterbore 22.

The lip 40 has a circumferentially extending inclined outer rim surface 54 formed between the first sealing surface 52 on an outer portion 56 of the sealing collar 40. A second rounded, circumferentially extending contact and sealing surface 58 is formed on an inner portion of the sealing collar member 40 opposite the first sealing surface 52. When the lip 40 is unflexed (FIG. 2), the sealing surface 58 extends radially outwardly beyond the outer diameter 32 of the seat ring 20. The surface 58 on flexible lip 40 provides, in a manner to be set forth, a second of the dual seals according to the present invention by sealing with a cylindrical inner wall 22b of the counterbore 22. The sealing occurs due to sealing contact of surface 58 with an inner cylindrical wall 22b of the counterbore 22. The sealing ring 46 has an inwardly extending inclined surface 60 extending from the surface 56 to a rounded or arcuate juncture 62 with an inner face 64 of the seat ring 20 to define a chamber 66.

In one example, seat ring 20 begins at the arcuate transition surface 48 beginning at an upper end of the rear shoulder 42. The rear face 46 of the sealing lip 40 extends radially outwardly (FIG. 3) from the vertical upwardly to the first sealing contact surface 52. The first sealing contact surface 52 extends rearwardly beyond the vertical plane of the rear surface 42 in an unflexed position or condition. The outer rim surface 54 extends from contact surface 52 at an angle from the vertical to the second sealing surface 58. The second sealing surface 58 is also rounded to an arcuate surface. The second sealing contact surface 58 extends radially outwardly beyond the outer diameter of the seat ring 20 in the unflexed position, due to the clearance between the outer diameter of seat ring 20 and the side wall of counterbore 22.

Figure 3:
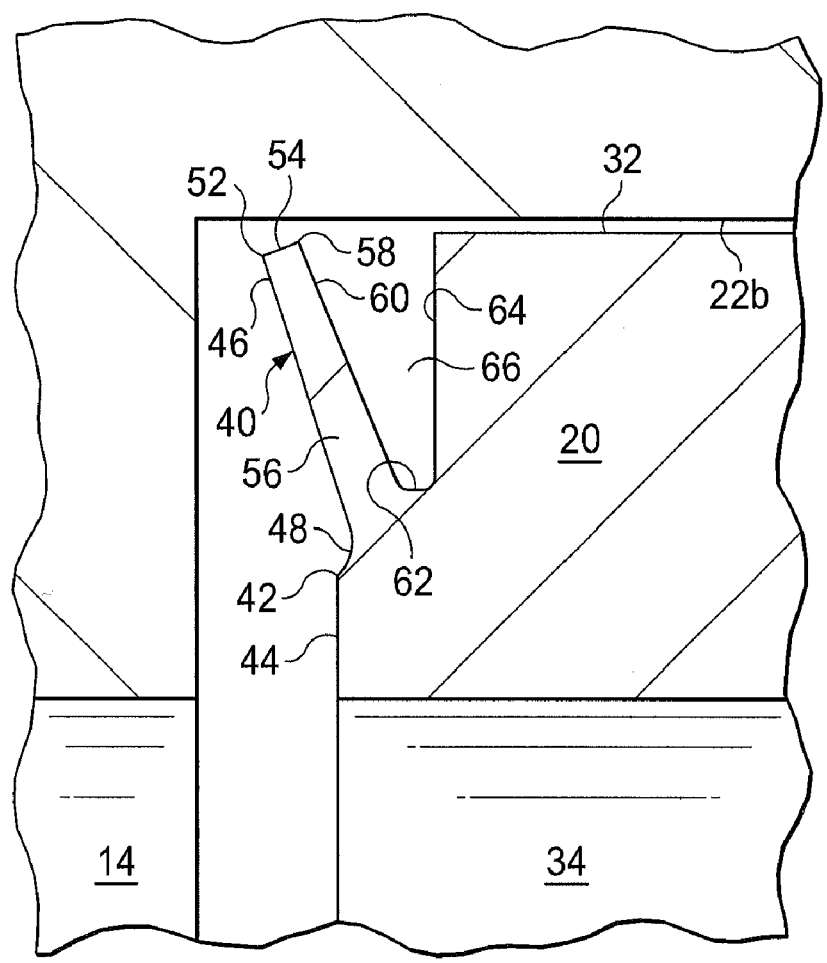
FIG. 3 is a further enlarged sectional view of a portion of the seat ring of FIG. 2.

The inwardly extending inclined surface 60 is formed at an angle (FIG. 3) from the vertical downwardly to the arcuate juncture 62, which is rounded with an arcuate surface. The transition surface between the inner passage 14 and the rear shoulder 42 has an inclined bevel or chamfer surface at an angle from vertical, and the rear end of an outer wall of the seat ring 20 has a similar chamfer or bevel surface (FIG. 3).

During operation of the present invention, as a load is applied the seat ring 20 moves rearwardly in the counterbore 22 and the first sealing surface 52 contacts the rear wall 22a of the counterbore. As the seat ring 20 continues rearward movement, the sealing lip 40 flexes forwardly towards the remaining structure of the seat ring 20. The flexure or deflection is essentially elastic and non-permanent. The first metal to metal seal according to the present invention is thus formed between surface 52 and the rear wall 22a of the counterbore 22.

Figure 5:
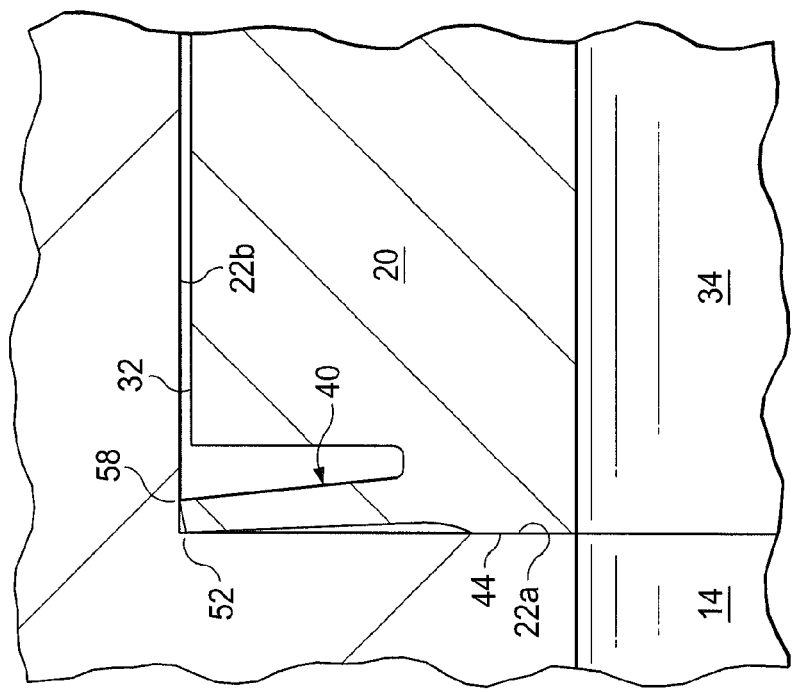
FIG. 5 is an enlarged sectional view of the structure of FIG. 3 illustrating a second of the dual seals formed with the present invention.
Figure 4:
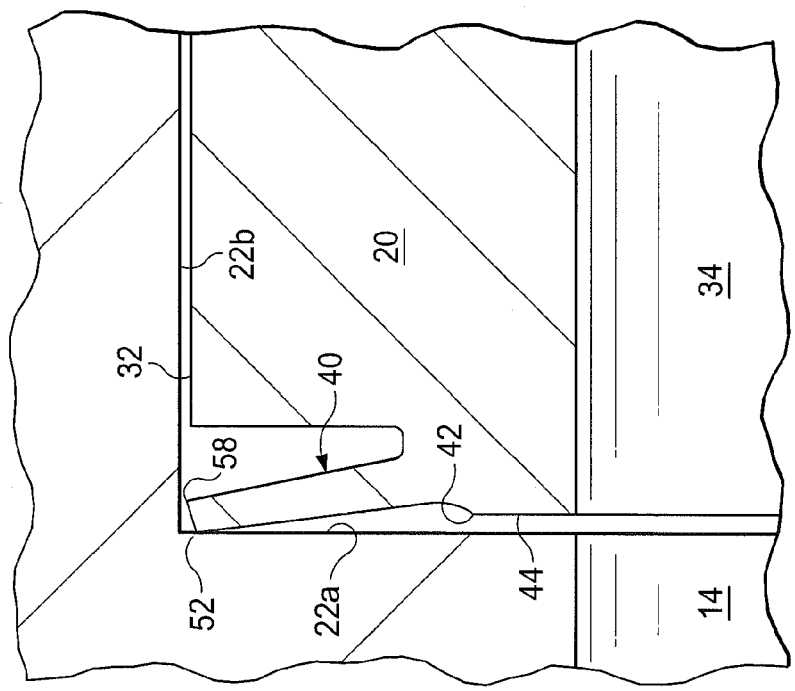
FIG. 4 is an enlarged sectional view of the structure of FIG. 3 illustrating a first of the dual seals formed with the present invention.

As applied forces on the seat ring 20 increase, contact is made between the rear surface 44 of the seat ring 20 (FIG. 5) and the rear wall 22a. At this time, lip 40 flexes and surface 52 continues in sealing engagement with rear wall 22a. As flexure of the lip occurs, contact is made by the second sealing surface 58 against inner cylindrical wall 22b of the counterbore 22, forming the second metal to metal seal according to the present invention.

As can be seen, the gate valve seat the seat ring 20 according to the present invention flexes when loaded from pressure on the closed gate. The gate valve 10 is provided with a floating seat with static metal sealing by lip 40 on the seat to the body or rearward side at surface 52, as well as on the seat to gate or outward side at surface 58. The structure of the lip 40 causes a metal to metal seal to be formed in these two places when the seat is loaded due to pressure when the gate valve 10 is closed.

The seals formed according to the present invention are reliable in harsh service conditions because of the metal to metal seals formed. The seat ring 20 according to the present invention thus provides increased reliability and permits gate valve usage under a wider range of applications.

While the invention has been shown in its preferred form, it should be apparent to those skilled in the art that it is not so limited but is susceptible to various changes without departing from the scope of the invention.

What is claimed is:

1. A gate valve, comprising:
   a housing having flow passages with a common flow passage axis intersected by a gate cavity, each of the flow passages having a counterbore formed at an intersection of the gate cavity with each of the flow passages, each of the counterbores having a cylindrical inner wall and a rear wall;
   a gate that is movable within the cavity perpendicular to the flow passage axis for opening and closing the flow passages;
   a seat ring carried in each of the counterbores, each of the seat rings being axially movable relative to the counterbores between a forward position and a rearward position and comprising:
   a forward end for engagement by the gate, which pushes the seat rings from the forward position to the rearward position when the gate is moved into engagement with the seat rings;
   a rearward end that is spaced forward of the rear wall of the counterbore while the seat ring is in the forward position and into abutment with the rein wall while the seat ring is in the rearward position;
   a passage having a longitudinal axis and extending from forward end through the seat ring to the rearward end;
   a flexible lip formed on the seat ring at the rearward end, the flexible lip having a rearward sealing surface formed thereon that elastically deflects into sealing engagement with the rear wall of the counterbore when the gate moves the seat ring to the rearward position; and
   the flexible lip further having an outward sealing surface formed thereon that elastically deflects into sealing engagement with the cylindrical inner wall of the counterbore when the gate moves the seat ring to the rearward position.

2. The gate valve according to claim 1, wherein:
   the flexible lip extends radially outwardly and rearwardly relative to the flow passage axis; and
   a plane containing the rearward sealing surface is perpendicular to the flow passage axis and is spaced rearward from a plane containing the rearward end of the seat ring while the seat ring is in the forward position.

3. The gate valve according to claim 1, wherein the flexible lip has a thickness which decreases between an inner end joining the seat ring and the sealing surfaces.

4. The gate valve seat according to claim 1, wherein the the sealing lip is in an undeflected condition while in the forward position.

5. The gate valve according to claim 1, wherein the seat ring has a constant outer diameter from the forward end to the flexible lip.

6. The gate valve according to claim 1, wherein the flexible lip has an outer rim surface extending between the rearward and outward sealing surfaces, and the outer rim surface is flat and inclined with respect to the flow passage axis.

7. The gate valve according to claim 1, wherein the seat ring has a rear cylindrical sleeve portion formed on its rearward end and the flexible lip has a base that joins en the rear cylindrical sleeve portion.

8. The gate valve according to claim 1, wherein the outward sealing surface of the flexible lip has an outer diameter greater than the outer diameter of the seat ring while the seat ring is in the rearward position.

9. A gate valve comprising:
   a housing having flow passages with a common flow passage axis intersected by a gate cavity, each of the flow passages having a counterbore formed at an intersection of the gate cavity with each of the flow passages, each of the counterbores having a cylindrical inner wall and a flat rear wall;
   a gate that is movable within the cavity perpendicular to the flow passage axis for opening and closing the flow passages;
   a seat ring in each of the counterbores each of the seat rings comprising:

an annular member having a forward end face for sliding and sealing engagement by the gate;

a rearward end face on the annular member;

a bore extending through the annular member from the forward end face to the rearward end face;

an annular flexible lip formed on the annular member and encircling the rearward end face, the flexible lip extending rearwardly from the annular member and having a first sealing surface formed thereon for elastic sealing engagement with the rear wall of the counterbore;

the flexible lip having a second sealing surface formed thereon for elastic sealing engagement with the cylindrical inner wall of the counterbore;

wherein the seat rings move axially in a rearward direction within the counterbores to a rearward position in response to being engaged by the gate, the rearward movement causing the flexible lips to elastically increase in deflection against the rear walls of the counterbores; and the seat rings move axially in a forward direction from the rearward position in response to the gate being moved from engagement with the seat rings, the forward movement causing the flexible lips to elastically decrease in deflection against the rear walls of the counterbores.

10. The gate valve according to claim 9, wherein each of the annular members has a cylindrical outer diameter surface that is constant from the forward end face to the sealing lip.

11. The gate valve according to claim 10, wherein the second sealing surface of the flexible lip of each of the annular members has an outer diameter that is greater than the outer diameter surface while each of the seat rings is in the rearward position.

12. The gate valve according to claim 9, wherein while each of the sealing lips is in an undeflected condition, the first sealing surface of each of the flexible lips is rearward from a plane containing the rearward end face of the annular member.

13. The gate valve according to claim 9, wherein a plane containing the first sealing surface of each of the sealing lips is perpendicular to the flow passage axis and spaced rearward from a plane containing the rearward end face prior to contacting the sealing lips with the end walls.

14. The gate valve according to claim 9, wherein the flexible lip has an outer rim surface extending between the first and second sealing surfaces, and the outer rim surface is flat from the first sealing surface to the second sealing surface and inclined with respect to the flow passage axis.

15. The gate valve seat according to claim 9, wherein the annular member has a rear cylindrical sleeve portion that defines the rear end face, and the flexible lip is formed on the rear cylindrical sleeve portion.

16. The gate valve according to claim 9, wherein an arcuate transition surface is formed between the rear end face and an inner base portion of the flexible lip.

* * * * *